RESET INTEGRATOR

Filed July 18, 1960

Thaddeus J. Kusto
INVENTOR.

BY William R. Sherman

ATTORNEY

3,231,728
RESET INTEGRATOR

Thaddeus J. Kusto, New York, N.Y., assignor to Computer Systems, Inc., New York, N.Y., a corporation of New York Filed July 18, 1960, Ser. No. 43,662
13 Claims. (Cl. 235—183)

Figure 1:
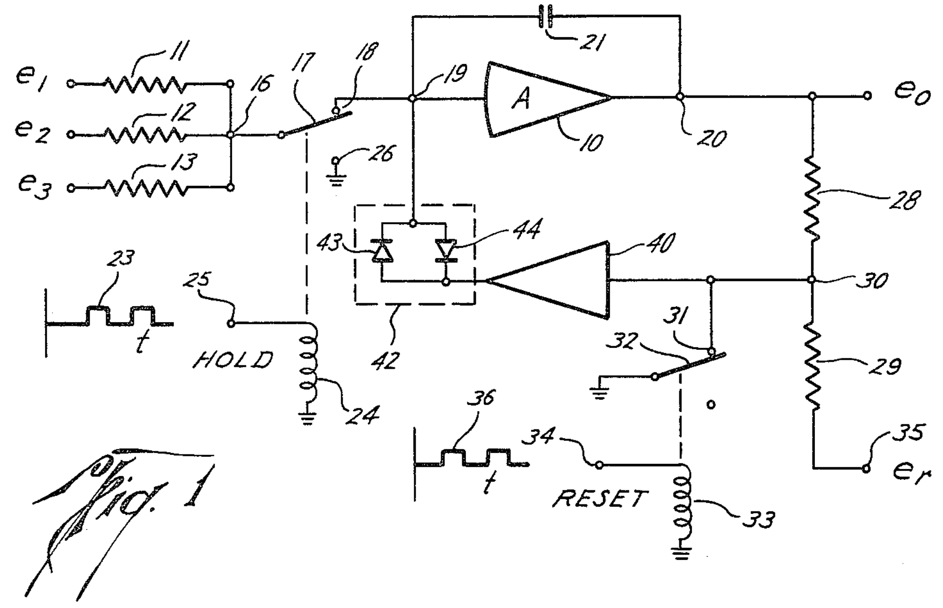

This invention relates to computing amplifier systems for use in analog computers or the like and more particularly to operational amplifiers, such as integrator amplifiers.

In analog computers, such functions as signal integration, setting in of initial values, and storage of machine variables are commonly performed by computing or operational integrator amplifiers. For such purposes, the integrator amplifier typically includes a high-gain, directly-coupled (D.C.) amplifier of single-ended, phase-inverting type having a degenerative feedback loop comprising a capacitor connected between its output and input terminals. At least one input resistor typically serves to provide serial connection of an input signal to the input terminal of the amplifier. If the forward gain of the amplifier is sufficiently high, say above 1,000, the output signal $e_o$ is the integral of the input signal $e_i$, as given in the expression:

$$e_0 = -\frac{1}{RCs} \cdot e_i$$

$1/s$ being the complex operator signifying integration, R the valve of the input resistor, and C the valve of the feed back capacitor.

Since the capacitor, in acting as an integrating element, acquires a charge essentially corresponding with the output voltage $e_o$, establishment of a new or different output voltage is dependent upon the time rate of charging or discharging the capacitor, the time constant being represented by the product RC. In order to reset the output voltage to an initial value $e_r$ at the start of an integrate cycle, then a feedback resistor of value $R_f$ is commonly arranged for connection in parallel with capacitor C and a reset voltage $e_r$ is applied to the input via a reset input resistor $R_b$, causing the operational amplifier to act as a lag summer. In this mode of operation, the high-gain inverting action of the amplifier causes the junction of $R_b$ and $R_f$ to be at virtual ground potential and, where $R_b$ equals $R_f$, the output voltage $e_o$ to equal the reset voltage $e_r$ with a reversal of polarity.

The resetting time for such an integrator amplifier to acquire a new output voltage value is then a direct function of the time constant $R_fC$, so that a short resetting time requires a short time constant. As an approximation, the resetting time is sometimes taken to be ten times the time constant. Since the resistors commonly employed for effecting reset are typically 100 kilohms to avoid unduly loading the output of the high-gain amplifier, and the feedback capacitor typically has a value of 0.01 microfarad in repetitive operation or 1.0 microfarad in real time operation, a representative time constant is one millisecond or 100 milliseconds, respectively. In practical applications, it is difficult to depart substantially from these impedance values so that little improvement in resetting time has been realized heretofore. Yet, there remains a strong impetus in the direction of a shorter resetting time, particularly for repetitive operation of integrator amplifiers.

In repetitive operation, the integrator amplifier goes through a cycle including a computing interval and a resetting interval. Typically, such intervals are of the same order of magnitude. During the reset cycle, the output voltage of the amplifier is brought to equality with some machine variable represented by a voltage at the reset input terminal, and during the computing interval, the reset input is disconnected and the data input is connected for integration of the input signal to the amplifier. For purposes of switching between the two conditions, mechanical relays are usually employed, a hold relay serving to switch the summing input point between the input terminal of the amplifier and ground, and a reset relay serving alternatively to connect the summing point of the reset and feedback resistors to the amplifier input terminal. With fast relays, repetition rates of 10 to 60 c.p.s. have heretofore been achieved by reducing the time of the compute cycle, thereby to allow a minimum of ten milliseconds for reset to new initial conditions which are introduced via the integrating amplifiers.

Besides the limitations on repetition rates presented by the resetting time constant, there is presented the difficulty of changing from mechanical relays to higher speed electronic switches, particularly for the hold relay which is connected between the input summing point and input terminal of the high-gain amplifier. Because of the very low impedance level at the input of the amplifier and the high gain presented to any noise voltages which might be introduced by an electronic switch, the design criteria are exceedingly difficult to meet.

Yet, an increase in repetition rate is highly desirable not only to shorten computing time but to render possible solutions for problems which heretofore could not be programmed on analog computing equipment High repetition rates also would make possible simultaneous operation on two or more different time scales, for example, a fast scale at a 1000 cycle repetition rate and a slower scale at, say 20 c.p.s. Again, high speed operation allows use of the integrator amplifier as an accurate memory device for high speed acquisition and storage of voltage values representing machine variable appearing during dynamic solution of a problem. For example, where a dynamically varying voltage is applied to the reset input terminal, a conventional integrator amplifier in the reset cycle will exhibit an output voltage continually lagging the variations in input with a consequent error, whereas it is desirable to maintain instantaneous and continuous correspondence between the reset input voltage and the amplifier output voltage so that the latter may be retained in memory when the reset circuit is interrupted. Typical problems in need of solution by such high speed computing equipment are algebraic plate-to-plate equations for distillation, difference-differential equations, boundary value problems, partial differential equations, multiple integrals, and transport delay simulation.

It is, accordingly, an object of the present invention to provide new and improved computing amplifier systems which are characterized by a capacity for high-speed operation, particularly for purposes of voltage acquisition.

Another object of the invention is to provide new and improved computing amplifier systems which are adapted for repetitive operation at substantially higher speeds than heretofore making possible fast or multiple time scales without impairment of computation accuracy.

A further object of the invention is to provide new and improved computing amplifier systems capable of memorizing dynamically varying voltage values with high accuracy.

Still another object of the invention is to provide new and improved computing amplifier systems for integrating an input signal electronically and for quickly resetting to a new voltage value, yet not requiring a switch to interrupt the input circuit during the resetting operation.

These and other objects are attained, in accordance with the invention, by providing an operational amplifier having a feedback capacitor and connected, in the reset condition, as a lag summer, the reset summing point being coupled to the amplifier input via impedance transforming means effectively providing a low impedance source for charging the capacitor to a new value. Gating means may be provided in the reset loop, e.g., between the reset summing point and the amplifier input, so that the operational amplifier may be employed independently of the applied reset potential once the output of the operational amplifier has been brought into correspondence with the new value.

Because the time constant for resetting may be much shorter than the time constant for input signals to be integrated fast resetting may be accomplished without opening the input circuit.

Figure 2:
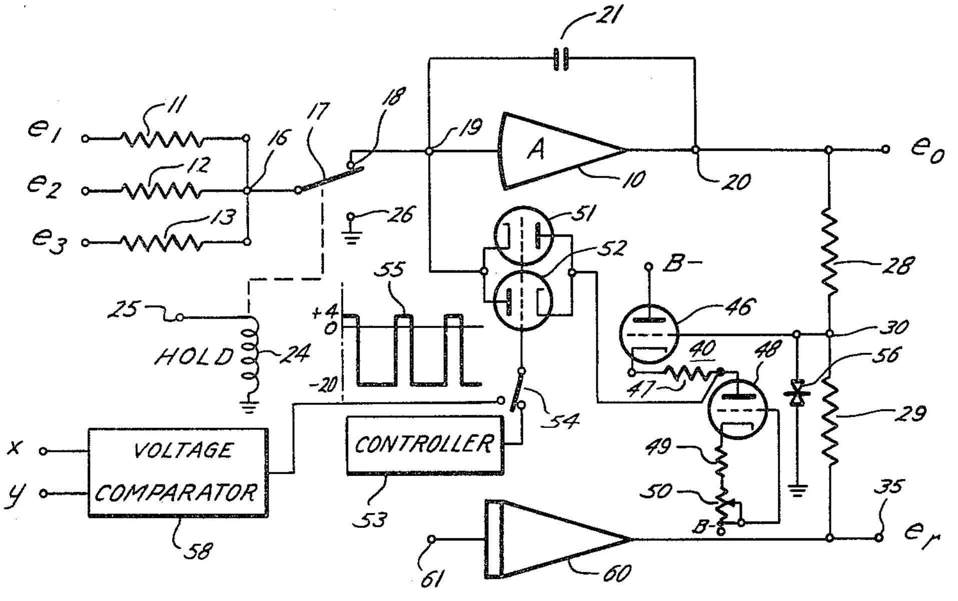

The invention, together with other of its objects and advantages, will be better understood from the following detailed description taken in conjunction with the accompanying drawing, wherein:

FIG. 1 is a schematic diagram of a computing amplifier system in accordance with the invention; and FIG. 2 is a schematic diagram of another embodiment of computing amplifier system in accordance with the invention.

A computing amplifier system is shown in FIG. 1 which, in accordance with the invention, is arranged not only for integration of input signals $e_1$, $e_2$, $e_3$, etc., to provide a corresponding output signal $e_o$, but is also arranged for acquiring a reset voltage $e_r$ very quickly. This system includes a high-gain D.C. amplifier 10 which may be of conventional direct-coupled (D.C.) design, incorporating automatic drift stabilization if desired. The gain A of the amplifier 10 is much greater than unity and preferably exceeds 1,000; for example, it may be $10^5$ or $10^6$. The amplifier is further of the phase inverting type and one-sided, but, for convenience, the grounded input and output terminals are not shown.

One or more signal input resistors 11, 12, 13 are connected via a common input summing point 16 and thence via hold (or balance) relay contacts 17, 18 to input terminal 19 of the amplifier 10. From output terminal 20 of the amplifier, an output voltage $e_o$ is derived. By the polarity inverting action of amplifier 10, resulting from an odd number of inverting stages or the like, the polarity of the output voltage $e_o$ is opposite that of the input signal. Hence, the feedback circuit connected from the output to the input of amplifier 10 and including an integrating element is degenerative or negative in operation. As illustrated, the feedback cicruit consisits of integrating capacitor 21.

The input connection afforded by contacts 17, 18 occurs in the de-energized (or compute) condition of hold relay 24. In the alternative of the compute condition (which is the hold condition) obtained by applying voltage 23 from a suitable source (not shown) to the ungrounded terminal 25 of relay 24, the summing point 16 is connected via contacts 17, 26 to ground thereby not disturbing any computing circuitry from which the input voltages $e_1$, $e_2$, and $e_3$ are derived, at the same time open circuiting the connection to input terminal 19.

As thus far described, the system corresponds with prior systems such as that described in Section 7.1 of the text "Electronic Analog Computers," by Korn and Korn (Second Ed., 1956, McGraw-Hill Book Co.). Such prior art systems also typically incorporate an integrator reset circuit including a pair of similar valued resistors connected in the manner of resistors 28, 29 of FIG. 1 having their junction or summing point 30 grounded through contacts 31, 32 of reset relay 33 when it is de-energized. When energized by application of a voltage 36 to ungrounded relay terminal 34 from a suitable source which may be a machine programmer supplying voltage 23 also, the summing point 30 is ungrounded and, in accordance with the prior art, would be then directly connected to the input terminal 19 of the amplifier 10. In this reset condition, with reset voltage $e_r$ applied at reset input terminal 35 and with the hold relay 24 energized or open, the operational amplifier responds as a lag summer to bring the output voltage $e_o$ into substantial equality with the reset voltage $e_r$ provided $e_r$ is a constant signal.

In this manner, a voltage representing an initial condition can be set up through charging of integrating capacitor 21, to be held at the output of the amplifier for use in a computation. However, acquisition of the voltage $e_r$ at the output of the integrator amplifier entails a sacrifice in computing time or accuracy, or both, due to the lag introduced by the charging rate of capacitor 21. Since, to a good approximation, the time constant for charging capacitor 21 is the product of its capacitance C (typically 0.01 microfarad) and the resistance R of reset feedback resistor 28 (typically 0.1 megohm), the resetting time for the integrator amplifier may be taken as ten times the product RC (i.e., 0.001 second) or a total of 0.01 second. Unless accuracy is to be sacrificed by terminating the resetting operation before the output has fully reached the new initial condition voltage $e_r$, there is thus imposed a limit on repetitive resetting of approximately 25 c.p.s. In some instances, repetition rates have been achieved in the prior art as high as 100 c.p.s. but obviously at substantial sacrifice of overall performance and actually without the introduction of initial condition values.

In accordance with the present invention, the time constant, obtained when the integrator amplifier is in its reset condition and operating as a lag summer, is shortened to the order of 10 microseconds, thereby permitting repetition rates an order of magnitude or higher than attained in the prior art, yet without sacrifice of accuracy. This remarkable improvement is realized by connecting between the reset summing point 30 and the input terminal 19 of amplifier 10, impedance transforming means providing a high impedance to the summing point 30 and a low impedance source to the input terminal 19. Such impedance transforming means is further arranged to present substantially no loading down of the input to amplifier 10 when the integrator amplifier is not in its reset condition.

As shown in FIG. 1, the impedance transforming means may conveniently be an amplifier 40 of any suitable form, preferably direct-coupled and having a gain near unity or higher, dependent upon loop stability conditions, and characterized by a high impedance input and low impedance output. The reset amplifier may be either single or multiple stage (though not phase inverting), with or without feedback stabilization, or using feedback, if desired, to increase the degree of impedance transformation. While a wide variety of vacuum tube and solid state amplifiers can thus be conveniently employed for this purpose, the amplifier 40 is readily exemplified by the cathode follower shown and described in connection with FIG. 2.

With reset relay 33 energized to break contacts 31, 32, the ungrounded input terminal of amplifier 40 has applied to it the weighted algebraic sum of voltage $e_o$ and $e_r$ at reset summing point 30. With reset relay 33 de-energized, the input of amplifier 40 is grounded and its output is correspondingly substantially zero. In order to insure isolation of the low impedance output of amplifier 40 from the input terminal 19 of amplifier 10 in this inoperative condition of the reset loop circuit, the output of amplifier 40 may be coupled via isolating network 42 to such input terminal 19, the isolating network conveniently consisting of a pair of silicon diodes 43, 44 connected in oppositely-poled, parallel relation. The operational amplifier thus described accordingly has an improved reset circuit affording remarkable advantages in speedy voltage acquisition.

In a typical operation of the computing amplifier system of FIG. 1, an initial condition represented by the value of reset voltage $e_r$ is set up prior to computation by energizing and opening the reset relay 33. Since the high gain of D.C. amplifier 10 insures that its input voltage will be driven substantially to zero by degenerative feedback, the charge existing on integrating capacitor 21 at the time of energizing the reset relay will be determined substantially by the existing value of the output potential $e_o$, the value of which is general will differ from the initial condition value represented by the potential $e_r$.

At the start of the resetting operation, then, the voltage at the reset summing point 30 is equal to the existing output voltage $e_o$ of amplifier 10 weighted inversely by the value of resistor 28, minus the reset voltage $e_r$ weighted inversely by the value of resistor 29. In other words, with resistors 28 and 29 of equal value, the voltage at the reset summing point 30 is $e_o - e_r$ and such difference voltage is applied to the high impedance input of amplifier 40, thus drawing very slight current and consequently maintaining a high accuracy of summation. That the reset amplifier input draws little current is of importance because typically the reset voltage $e_r$ is derived from a high impedance source such as a potentiometer calibrated with substantially no current drain, and further because D.C. amplifier 10 typically has a limited current output specified in accordance with demands of operational amplifiers connected with its output.

In response to the difference voltage at the reset summing point, the impedance transforming amplifier 40 tends to develop a corresponding voltage across its low impedance output which is of like polarity. As long as such output voltage exceeds the threshold voltage for conduction characterizing the silicon diodes 43, 44, translation of such output voltage to the input terminal 19 of amplifier 10 is substantially unimpaired. That is to say, the isolating circuit 42 offers substantially zero resistance when the output of amplifier 40 exceeds its threshold voltage, which may be on the order of several hundred millivolts, otherwise appearing as an open circuit between the output of amplifier 40 and input terminal 19 when its threshold is not exceeded.

As the resetting operation continues, then, the output voltage of amplifier 40 initially grows to a value exceeding the threshold of isolating circuit 42 and thereafter delivers charging current through the isolating circuit to the integrating capacitor 21 at a rate determined by the output impedance of amplifier 40 as well as the capacitance of capacitor 21. Since the output impedance is relatively low (as compared with a resistance $R_f$ of feedback resistor 28 of 0.1 megohm, for example) and may be on the order, say, of only a fraction of an ohm to 50 ohms, the time constant is now measured in microseconds, resulting in an extremely rapid charging of integrating capacitor 21. At the same time, the high gain inverting action of the D.C. amplifier 10 forces the voltage at the reset summing point 30 to reach with the same rapidity an extremely low value representing virtual ground potential, thus resetting the output of amplifier 10 to the initial condition imposed by application of the reset voltage $e_r$.

With the exemplary values given, a time constant of 10 microseconds may be obtained, and the resulting time for resetting the integrator amplifier, approximated as ten time constants, is thus on the order of 100 microseconds. Effectively, then, the limitation on speed and accuracy in the acquisition of a voltage applied at the reset input terminal is no longer governed by a lag in charging of the integrating capacitor 21 as in the prior art, but instead only by such considerations as high frequency cut off and stability characteristics of the amplifier. Reset repetition rates of 60 solutions per second or even 1000 or higher are thus readily attained with high accuracy and with introduction of initial condition values, representing more than an order of magnitude improvement over prior art and lending an extreme versatility to the applications of the present integrator amplifier. At the same time, operation of the amplifier 10 with a compute-reset operation at such a repetition rate avoids the necessity of incorporating a drift stabilizing circuit in the amplifier.

For non-repetitive operation with the hold relay 24 energized, a dynamically varying potential may be applied at the reset input terminal 35 with the reset relay likewise energized so that a corresponding voltage is continually developed at the output terminal 20 of amplifier 10, ($e_o = e_r$). At any precisely chosen instant of time, reset relay 33 may be momentarily de-energized, leaving the then existing value of the variable potential held at the output 20 and effectively memorized. Alternatively, the reset relay may be momentarily or periodically energized in synchronism with a repetitive computing cycle operating at a high cyclic rate for solutions of partial integral and differential equations and of eigen-value and boundary-value problems, for example, or automatic step-by-step solution of difference equations. Other aspects of the versatility permitted by the extremely rapid voltage acquisition and dynamic memory characteristics of this integrator amplifier will readily be perceived.

It will be understood that the relays and particularly reset relay 33 should be capable of high speed operation as is realized, for example, with millisecond relays but that advantages such as higher switching speeds may be realized by substituting diode or transistor gates and high speed triggers for the relay or using a reset amplifier of the electronically gated type. On the other hand, for repetitive operation the hold relay 24 may be left in its de-energized or closed condition even with input voltages $e_1$, $e_2$, $e_3$ applied to the summing point 16. This would not be possible with prior art integrator amplifiers because the time constant for the input circuit is of the same order of magnitude as the time constant for the resetting circuit. However, with the time constant for the resetting circuit extremely short compared to the input circuit time constant, as achieved by the present invention, the output voltage $e_0$ of the D.C. amplifier 10 may be periodically reset to the voltage $e_r$ at the reset input terminal very rapidly without experiencing any substantial contributions from input signals $e_1$, $e_2$, $e_3$. With the fast reset obtained by the present invention, then, no switch or relay is required between input summing point 16 and amplifier input terminal 19 having a correspondingly high speed. Thus, the need for high speed electronic switching and the attendant problems of noise at the input of the high gain amplifier 10 are obviated.

As seen in the embodiment of the invention shown in FIG. 2, the reset relay or switch 32 need not be connected in shunt between the reset summing point 30 and the input of the impedance transforming amplifier but may instead be connected in series between its output and the input 19 to amplifier 10. In particular reset summing point 30 is shown connected to the control grid of a triode 46 which, together with resistor 47, triode 48 and resistors 49, 50 in its cathode circuit, operates as a cathode follower. The plate of triode 46 is connected to a positive voltage terminal B+ and the cathode connected through resistor 47, triode 48, resistor 49 and balancing resistor 50 to the negative terminal B—, the opposite voltages conveniently being of equal magnitude, such as 100 volts. The grid of triode 48 is also connected to the B— terminal. The anode of triode 48 is arranged for connection via an electronic switch consisting, for example, of oppositely-poled, parallel-connected triodes 51, 52 to input terminal 19 of amplifier 10.

Electronic switch 51, 52 may be operated by means of a controller 53 connected via manual switch 54 and having the form, for example, of a multivibrator, providing an output voltage switched between positive and negative values, for example, +4 and —20 volts to gate the electronic switch open and closed, respectively. In repetitive operation the switching signal for controller 53 is then a square wave voltage 55 as illustrated. In order that the controller may close the switch 51, 52 without requiring an extreme negative voltage excursion, it is desirable to connect a limiting device such as Zener diode unit 56 between the reset summing point 30 and ground. Where the controller supplies voltages of +4 and −20 volts, for example, the Zener diode unit 56 may limit voltage excursions applied to the input of the cathode follower amplifier to ±8 volts conveniently, with unity amplifier gain thereby limiting the output of the amplifier to the same ±8 volt excusion. With a +4 volt output from controller 53, for example, triode 51 is conducting with a positive output from the amplifier 40 and triode 52 is conducting with a negative output, thereby providing a very low impedance connection of the impedance transforming amplifier to the input terminal 19 of amplifier 10. To open the reset circuit, application of the −20 volt signal from controller 53 cuts off both triodes 51, 52, whether the reset amplifier output is positive or negative within its ±8 volt limits.

Instead of opening and closing the reset circuit at the beginning and end of a reset interval alternating with a compute interval in a constant frequency repetitive operation, it may be desirable to stop the resetting operation at an instant determined by the computation. For this purpose, the electronic switch may be connected via manual switch 54 to a voltage comparator 58, for example, having two input terminals to which are applied voltages representing machine variables (or one a reference level) symbolized by "$x$" and "$y$" and an output whose polarity is dependent on the relative amplitude of the inputs. In accordance with a possible utilization of the system, the electronic reset switch 51–52 is energized when the value of $x$ exceeds the value of $y$. Other criteria for energization of the reset switch or relay may, of course, be employed.

To illustrate a possible application of the system as a dynamic memory characterized by rapid voltage acquisition, the potential applied to the reset input resistor 29 is shown in FIG. 2 to be derived from a computing or operational amplifier 60, which may be constructed in accordance with the present invention, or a conventional summer, integrator or the like, the input terminal 61 of which is suitably connected in the overall computing system.

The operation of the embodiment of FIG. 2 is, of course, generally similar to that of FIG. 1. Open circuiting of the reset loop by cutting off triodes 51, 52 effectively isolates the computing amplifier 10 from the reset input potential, just as, in FIG. 1, grounding of the input of amplifier 40, together with isolation by circuit 42, effectively isolates the reset voltage $e_r$ from the amplifier input terminal 19.

With the triodes 51, 52 conducting and output voltage $e_0$ initially zero, for example, the cathode voltage of triode 46 tends to build toward a potential equal to the reset potential $e_r$, thus charging integrating capacitor 21 via the low resistance of the cathode circuit 48–50. The cathode voltage will actually never reach the initial difference potential at reset summing point 30, because the high gain inverting action of amplifier 10 continually tends to drive the output voltage $e_0$ toward equality with the reset voltage. In other words, the grid potential of triode 46 is diminished even as its cathode potential tends to rise. With an exemplary cathode circuit resistance on the order of 50 ohms and a capacitance of integrating capacitor 21 on the order of 0.01 microfarad, for example, the cathode potential has only a momentary rise lasting less than 5 microseconds before a stable condition is reached with the output voltage $e_0$ substantially equal to the reset voltage $e_r$ (or corresponding to it if weighting resistances 28, 29 are not equal).

Where reset voltage $e_r$ is derived from the output of operational amplifier 60, it typically will have a dynamically varying value dependent upon the course of computation. Acquisition of such voltage, according to the invention, can be rapidly attained at any desired instant, for example, when the value of $x$ exceeds the value of $y$, so that the acquired potential appears as the output potential $e_0$. Comparator 58 produces a positive output when $y$ exceeds $x$ and closes reset switch 51–52 so that $e_0$ tracks $e_r$ in close correspondence. When the value of $x$ exceeds the value of $y$, comparator 58 produces a negative voltage output thereby opening reset switch 51–52, and amplifier 10 then holds in memory by capacitive storage an output voltage equal to the value of $e_r$ at the instant of switch opening. It is noteworthy that the dynamically varying potential $e_r$ may be stored at the output of the integrator amplifier at any instant without the inaccuracies inherent in prior art systems due to lag. For example, application of a linearly increasing voltage or ramp potential to the reset terminal of a prior art integrator amplifier would produce a ramp output potential $e_0$ which at every instant differed from the reset potential $e_r$ by a fixed error voltage dependent upon the resetting time constant. Only by the extreme shortening of the resetting time constant made possible by the present invention is a large error avoided, so that use of an integrator amplifier as an accurate memory for dynamically varying voltages is now possible.

If desired, a capacitor may be connected in parallel with reset input resistor 29 having a capacitance value substantially equal to the time constant of the reset circuit divided by the resistance of resistor 29. In such manner, the extremely slight lag achieved in accordance with the present invention may be further reduced or offset to reduce any residual error in tracking or acquiring the reset voltage. In another aspect, it will be recognized that the input circuitry including summing resistors 11–13 and the hold relay may be omitted when the integrator amplifier is employed as a memory device. In a typical analog computer installation, provision is made for plug-in connections and the like so that the basic integrator amplifier may be employed in various of the ways herein described.

Various additional modifications and applications of the principles of the invention will occur, utilizing the high order of versatility consequent upon the very rapid voltage acquision made possible by the invention. Accordingly, the invention is not necessarily restricted to the embodiments shown and described, but is of a scope defined in the appended claims.

I claim:

1. A computing amplifier system comprising an operational amplifier having a first feedback loop connected directly between its output and its input and including an integrating capacitor, and a second feedback loop connected directly between its output and its input and including a feedback resistor, to which feedback resistor a reset input resistor is connected at a summing point in said second loop, and low output impedance source means responsive to the potential at said summing point selectively to complete said second feedback loop whereby the output potential of said operational amplifier may be rapidly reset to the value of a potential applied via said input resistor.

2. A computing amplifier system comprising an operational amplifier having a first feedback loop connected directly between its output and its input and including an integrating capacitor, and a second feedback loop connected directly between its output and its input and including a feedback resistor, to which feedback resistor a reset input resistor is connected at a summing point in said second loop, and low output impedance source means responsive to the potential at said summing point for applying a corresponding potential degeneratively to the input of said operational amplifier, and means for selectively switching said second loop between operative and inoperative conditions.

3. A computing amplifier system in accordance with claim 1 wherein said switching means grounds the input of said source means to render said second loop inoperative.

4. A computing amplifier system as defined in claim 2 wherein said switching means selectively disconnects the output of said source means from the input of said amplifier to render said second loop inoperative.

5. A computing amplifier system comprising an operational amplifier having at least one input resistor connected to an input summing point, a first feedback loop connected directly between its output and its input and including an integrating capacitor, and a second feedback loop connected directly between its output and its input and including a feedback resistor, to which a reset input resistor is connected at a reset summing point in said second loop, and low output impedance source means responsive to the potential at said reset summing point for applying a corresponding potential degeneratively to said operational amplifier, and means for selectively switching said second loop between operative and inoperative conditions and for disconnecting said input summing point from said amplifier when said second loop is in its operative condition.

6. A computing amplifier system comprising an operational amplifier having a first feedback loop connected directly between its output and its input and including an integrating capacitor, and a second feedback loop connected directly between its output and its input and including a feedback resistor, to which a reset input resistor is connected at a summing point in said second loop, and amplifier means having a high impedance input responsive to the potential at said summing point and having a low impedance output arranged for connection to complete said second feedback loop whereby the output potential of said operational amplifier may be rapidly reset to the value of a potential applied via said reset input resistor.

7. A computing amplifier system comprising an operational amplifier having a first feedback loop connected directly between its output and its input and including an integrating capacitor, and a second feedback loop connected directly between its output and its input and including a feedback resistor, to which a reset input resistor is connected at a summing point in said second loop, and a cathode follower having its input connected to said summing point and its output connected to complete said second feedback loop.

8. A computing amplifier system comprising an operational amplifier having at least one input resistor connected to an input summing point, a first feedback loop connected directly between its output and its input and including an integrating capacitor, and a second feedback loop connected directly between its output and its input and including a feedback resistor, to which a reset input resistor is connected at a reset summing point in said second loop, amplifier means responsive to the potential at said reset summing point and having a low impedance output, and an isolating circuit for connecting said low impedance output with an input terminal of said operational amplifier to complete said second feedback loop, and means for selectively switching said second loop between operative and inoperative conditions and for selectively connecting said input summing point with said input terminal of said operational amplifier.

9. A computing amplifier system as defined in claim 8 wherein said isolating circuit includes a pair of diodes connected in oppositely poled parallel relation and having a relatively low threshold voltage for conduction.

10. Apparatus for acquiring and storing a voltage comprising a high gain amplifier and a feedback capacitor arranged as an integrator, a feedbck resistor and a reset resistor having a common summing point and their remaining terminals connected respectively to the output of said amplifier and a source of voltage, and source means having a low impedance output for momentarily translating the voltage at said summing point to the input of said amplifier to bring the output voltage of said amplifier into substantial correspondence with the voltage of said source at the instant of translation.

11. A computing amplifier system comprising an operational amplifier having connected between its input and output terminals a first feedback loop including an integrating capacitor and a second feedback loop including a feedback resistor, to which a reset resistor is connected at a summing point in said second loop, and low output impedance source means responsive to the potential at said summing point for applying a corresponding potential degeneratively to the input terminal of said operational amplifier, and means for selectively presenting to said input terminal a high impedance to a ground point in said second feedback loop to render the latter inoperative.

12. A computing amplifier system comprising an operational amplifier having at least one input resistor connected to an input summing point, first and second feedback loops connected between input and output terminals of said amplifier, said first feedback loop including an integrating capacitor and said second feedback loop including a feedback resistor, to which a reset resistor is connected at a reset summing point in said second loop, and low output impedance source means responsive to the potential at said reset summing point for applying a corresponding potential degeneratively to the input terminal of said operational amplifier, and means for selectively switching said second loop between operative and inoperative conditions while said input summing point is connected to said input terminal, at a rate such that said operative condition is short with respect to the time constant for signals applied to said input resistor.

13. A computing amplifier system comprising a high gain amplifier and a feedback capacitor connected directly between the signal input and output terminals of said amplifier to constitute therewith an integrator, a feedback resistor and a reset input resistor having a common summing point and their remaining terminals connected respectively to the output of said amplifier and a source of reset voltage, and low output-impedance source means having its input connected with said summing point and its output arranged for connection with the signal input of said amplifier to drive the same as a lag summer.

References Cited by the Examiner

UNITED STATES PATENTS

| | | | |
|---|---|---|---|
| 2,675,469 | 4/1954 | Harker et al. | 235—183 |
| 2,750,110 | 6/1956 | Och | 235—183 |
| 2,789,761 | 4/1957 | Merrill et al. | 235—183 |
| 2,843,736 | 7/1958 | Huntley | 250—27 |

OTHER REFERENCES

Page 1525, September 1958, Fogiel, "Derivative Via Integration," Instruments and Automation.

Page 347, 1956, Korn and Korn, Electronic Analog Computers, N.Y., McGraw-Hill.

MALCOLM A. MORRISON, *Primary Examiner.*

WALTER W. BURNS, Jr., *Examiner.*